Patented Jan. 15, 1952

2,582,452

UNITED STATES PATENT OFFICE 2,582,452

TRANSPARENT, FLAME-RESISTANT POLYSTYRENE

Harry S. Olson and Robert C. Danison, Painesville, Ohio, assignors to Diamond Alkali Company, Cleveland, Ohio, a corporation of Delaware No Drawing. Application December 16, 1948, Serial No. 65,735

1 Claim. (Cl. 260—28.5)

This invention relates to transparent, flame-resistant, thermoplastic compositions and more particularly relates to transparent, flame-resistant, polystyrene compositions incorporating highly chlorinated paraffin wax.

The term "flame-resistant," as used hereinafter in the specification and appended claim, refers to that property, possessed by the compositions of this invention, to resist combustion to the extent at least that they do not independently support combustion and are thus self-extinguishing. This property manifests itself in that such materials, when once set afire by contact with a flame, do not continue to burn for more than three seconds after such contact has ceased.

It has heretofore been proposed to render polystyrene flame-resistant by the admixture therewith of highly chlorinated hydrocarbons. In general, the chlorinated hydrocarbons heretofore employed for the purpose have included the highly chlorinated aromatic hydrocarbons, such as naphthalene and diphenyl, and highly chlorinated paraffin wax.

Chlorinated aromatic hydrocarbon derivatives are highly toxic materials to warm-blooded animals and since they possess appreciable volatility when subjected to heat, such as at temperatures normally encountered in injection or pressure molding procedures, they are not suitable for use in flame-resistant compositions, particularly molding compositions. Moreover, it has been found heretofore that chlorinated aromatic hydrocarbons impart opacity to polystyrene and may thus not be employed in the art of preparing transparent, flame-resistant, injection or pressure molded shapes.

The chlorinated paraffin waxes heretofore employed for rendering polystyrene flame-resistant have, in general, been those possessing the highest degree of chlorination within the limits of commercial practicability, for example, chlorinated paraffin waxes containing from 70% to 75% of chemically combined chlorine. However, clear, transparent, flame-resistant compositions cannot be obtained employing these chlorinated paraffin waxes as such, since these materials contain a relatively minute quantity of substances insoluble in all common organic solvents and polystyrene, and sufficient opacity is imparted by such insoluble material to the styrene to preclude transparency. Accordingly, it has been necessary to process the chlorinated paraffin by a series of special and time-consuming treatments in order to destroy or remove the opacifying constituents present therein. Thus, it has heretofore been necessary to dissolve the chlorinated paraffin in a suitable solvent and either filter the solution to remove the insoluble opacifying constituents hereinabove referred to or ball-mill the solution to reduce the particle size of the insoluble substances to such an extent that these substances become ineffective as opacifying agents therein. Thereafter, the so-treated solution of chlorinated paraffin wax must be combined with a solution of the polystyrene; finally, the solvent is evaporated from such solution.

The opacifying substances present in ordinary highly chlorinated paraffin, such as that containing 70% or more of chemically combined chlorine, are formed in the process of chlorination of the paraffin hydrocarbon material. They behave in the manner of extremely high molecular weight chlorinated compounds and apparently are polymers of molecular fragments produced during the chlorination of the paraffin material; since such materials do not dissolve readily in ordinary organic solvents nor in polystyrene, they impart appreciable opacity to compositions comprising such highly chlorinated paraffin wax even though present in but very minor amounts.

One of the objects of the present invention is to provide a transparent, flame-resistant composition comprising polystyrene combined with chlorinated paraffin wax, in which chlorinated wax the expensive treating steps, which must be applied to the chlorinated paraffin material to remove the insoluble opacifying constituents thereof, are eliminated.

Another object is the obtaining of a clear, transparent, flame-resistant, thermoplastic composition by the direct combination of its several components.

Other objects will appear from the discussion hereinafter.

In fulfilling these objects, the present invention contemplates employing a highly chlorinated paraffin wax, for example, a highly chlorinated derivative of an aliphatic hydrocarbon wax having a molecular weight within the range of $C_{18}$ to $C_{36}$ hydrocarbons, preferably an average corresponding to $C_{24}$ hydrocarbons, the degree of chlorination of which is carefully controlled to fall within a specified range, whereby the existence of the solvent and polystyrene insoluble fraction heretofore referred to is substantially eliminated and the property of compatibility with polystyrene, as well as the resinous, thermoplastic properties of the chlorinated paraffin per se, and the flame-resistant character of the chlorinated paraffin are preserved. Since chlorinated paraffin wax thus obtained is infinitely soluble in the polystyrene, the transparency thereof is maintained. At the same time, the combination is found to have the same flame-resistance as prior art compositions, whereby the compositions of the present invention are more desirable in the art of molding transparent, flame-resistant shapes from polystyrene than those incorporating the opacifying chlorinated paraffin waxes or the specially treated materials heretofore available.

The compositions of the present invention are organic, resinous, transparent, flame-resistant, thermoplastic compositions consisting essentially of a major proportion of polystyrene, a minor proportion of chlorinated paraffin wax derived from the class of waxes noted hereinabove, and containing from 64% to 68% of chemically combined chlorine, and a soluble organic stabilizer for said chlorinated paraffin wax.

The polystyrene employed in the compositions of the present invention is a hard, tough, resinous, thermoplastic material having an average molecular weight between about 50,000 and about 150,000 and is a transparent, colorless material especially suitable for molding of ornamental shapes. The degree of chlorination of the chlorinated paraffin wax incorporated in the compositions of the present invention is carefully controlled during the manufacture thereof, so that the amount of chemically combined chlorine contained therein falls substantially within the range of 64% to 68%. It has been found, as noted above, that where the amount of chemically combined chlorine in the chlorinated paraffin wax is in excess of about 68%, there is present in such chlorinated material appreciable amounts of insoluble bodies, which impart an opacity to the molded shapes of polymerized styrene comprising the same. Moreover, where flame-resistance sought to be imparted to the polystyrene is obtained solely by the addition thereto of chlorinated paraffin wax containing substantially less than 64% of chemically combined chlorine, the molded compositions are of less rigid character than is desirable for most structural purposes, in that a lessening of the tensile strength of the composition results, as well as a substantial lowering of the softening point of the composition. As the amount of chemically combined chlorine contained in the chlorinated paraffin wax decreases from the above disclosed range, such chlorinated paraffin wax partakes increasingly of the character of a liquid; also, as the amount of chemically combined chlorine is decreased, more of the chlorinated material will be required to impart the same desired degree of flame-resistance to the polystyrene. It is therefore apparent that where chlorinated paraffin wax containing less chemically combined chlorine than the above-indicated range is employed, the resulting molding composition will necessarily possess an undesirably decreased degree of structural strength for most molded thermoplastic articles.

When molding the compositions of the present invention, heat and pressure are applied thereto in order to obtain the desired shapes. For this reason, it is generally necessary to incorporate a stabilizer for the chlorinated paraffin wax in the composition. It is, of course, understood that the stabilizers employed in the compositions of the present invention are stabilizers which are effective in preventing the decomposition of chlorinated paraffin wax at the temperatures at which the molding of the compositions takes place, which temperatures are necessarily less than the pyrolyzing temperatures of the polystyrene. It is also understood that such stabilizers must not be effective in preventing the decomposition of the chlorinated paraffin wax at flame temperatures, inasmuch as it is believed that the decomposition of the chlorinated paraffin wax at flame temperatures accounts in part for the flame-resistant character of the otherwise inflammable organic composition. Moreover, the stabilizers to be employed in the compositions of the present invention, in order to be satisfactory, should be liquids or solids which are soluble in the mixture of polymerized styrene and chlorinated paraffin wax so as not to impart any degree of opacity to the compositions. A further requisite is that in addition to being soluble in the mixture of polystyrene and chlorinated paraffin wax, the products of reaction, if any, of such stabilizers with the products of decomposition of the chlorinated paraffin wax should not be insoluble in the polystyrene-chlorinated paraffin wax combination lest by their stabilizing action, opacity be introduced.

A wide variety of stabilizers may be employed in the compositions of the present invention, it having been found, however, that as a general class, the epoxy compounds or derivatives thereof are especially suitable. Examples of this general class of compounds found useful in this connection are propylene oxide, butylene oxide, phenyl ethylene oxide, diphenyl ethylene oxide, epichlorohydrin, glycidol and its ethers and esters, and the like. The alkyl aryl or mixed ether or ester derivatives of glycidol have been found especially useful in this connection, particularly desirable examples being the phenyl ether of glycidol, i. e., phenoxy propylene oxide, or the oleic acid ester of glycidol. This class of materials, and especially the last mentioned preferred members thereof, are particularly suitable stabilizers in that not only are they themselves soluble in the combination of chlorinated paraffin wax and polystyrene, but in addition, their products of reaction with the products of decomposition of the chlorinated paraffin wax are also soluble in the combination, whereby the opportunity for opacity to develop in the compositions of the present invention during storage and in use is substantially precluded.

For most of the uses to which the compositions of the present invention are put, it will be desirable to employ, in addition to the stabilizer materials mentioned above, a plasticizer for the combination of the polystyrene and chlorinated paraffin wax, which plasticizer should also be soluble in the mixture of the polystyrene and chlorinated paraffin wax and in addition, should not be subject to the formation of byproducts which are insoluble in such mixture and which would thereby impart opacity to the compositions. Various plasticizers which may be added to these compositions, either before compounding with the polystyrene or during the compounding of the flame-resistant composition, include the phosphoric acid esters, such as tricresyl phosphate, triphenyl phosphate, ethyl hexyl phosphate, and the like. These materials are particularly suitable in the compositions of the present invention for the reason that in the amounts in which they are used to plasticize the combination of polystyrene and chlorinated paraffin wax, they do not impart inflammability to the compositions. In addition, the phosphate esters are liquids, soluble in the polymerized styrene and chlorinated paraffin. Another class of materials which also possesses these characteristics is the chlorinated paraffin waxes which contain from 35% to about 55% of chemically combined chlorine. Since inorganic flameproof materials are not employed in the compositions of the present invention due to their opacifying effect, it is especially desirable to employ plasticizers, such as those mentioned, which are substantially flame-resistant in themselves, or possess only a very limited inflammability.

In order that those skilled in the art may better understand the special properties of the compositions of the present invention, and the manner by which the same may be obtained, the following specific examples are offered:

Example I

The ingredients employed are:

71.7 parts of polystyrene of average molecular weight of 100,000
27 parts of chlorinated paraffin containing 68% of chemically combined chlorine
1.3 parts of glycidyl oleate The styrene is rendered plastic on a rubber mill with both rolls heated by steam. When the styrene is thoroughly softened, the chlorinated paraffin and stabilizer are added and milling continued until thorough mixing is had.

Example II

The ingredients employed are:

70.75 parts of polystyrene having an average molecular weight of the order of 100,000
25 parts of chlorinated paraffin wax containing 68% of chemically combined chlorine
1.25 parts of phenoxy propylene oxide
4.00 parts of tricresyl phosphate A rubber mill having 2 rolls turning at different speeds is used to mix the above ingredients. The "fast" roll, which turns about 1.4 times as fast as the "slow" roll, is cooled, by means of cooling water sprayed internally of the roll, to about room temperature, while the "slow" roll is heated, by means of steam, to about 270° F. The polymerized styrene is placed on the rolls and allowed to form a sheet. As soon as a sheet has formed, the tricresyl phosphate and phenoxy propylene oxide are added and the milling action continued until these ingredients are mixed well into the styrene. Thereafter, the chlorinated paraffin wax is added to the mix on the rolls and mixed well into the composition.

Example III

The following ingredients are mixed together as described in Example II:

69 parts of polystyrene having a molecular weight of the order of 100,000
25 parts of chlorinated paraffin wax containing 68% of chemically combined chlorine
2 parts of phenoxy propylene oxide
4 parts of chlorinated paraffin wax containing 40% of chemically combined chlorine Tests for flame-resistance are performed as follows: A one-inch wide strip is cut from the rolled sheet as obtained from the mixing mill. This one-inch strip is suspended vertically in a draft-free cabinet, and a blue gas flame two-inches high is applied to the bottom of the strip for a period of 15 seconds. After this period of exposure to the flame, the time required for the test piece to extinguish the flame is noted. Three trials are run in each case and an average time of these three trials calculated. Compositions prepared according to Examples I and II ceased to flame within one second; the composition prepared according to Example III ceased to flame within three seconds.

The sheets of transparent, thermoplastic, flame-resistant compositions as obtained in the examples are quite clear, possessing only a very slight yellow tint, and may suitably be comminuted to any desired particle size to give a molding composition for either pressure or injection molding operations.

It has been found by experimentation that the formula given above in the examples may be varied over certain limits without destroying the flame-resistant property of the composition or its transparency. For example, amounts of polystyrene within approximately 63–73% of the total composition and amounts of chlorinated paraffin wax containing from 64% to 68% of chemically combined chlorine, within the range of approximately 18% to approximately 35% of the total composition, have been employed. A stabilizer for the chlorinated paraffin wax, particularly one chosen from those noted hereinabove, in an amount up to about 5% by weight of the chlorinated paraffin wax, has been used and plasticizer content, if plasticizers are used, may be up to 9%. In addition to the method of combining the ingredients of the compositions of the present invention hereinabove described, there may also be used a mill, such as a "Banbury" mill, which provides a somewhat greater amount of kneading action upon the composition during the mixing thereof, or the ingredients may be combined in a solvent vehicle, such as acetone, methyl ethyl ketone, and the like, in which all of the ingredients are soluble. For the preparation of molding compositions, however, the solvent method has some disadvantages in that the materials must be combined and dissolved in the solvent and the solvent thereafter removed, for example, by evaporation, from the composition and the solvent free residue then converted to suitable form for handling in injection or pressure molding apparatus. It is obvious therefore that the problems involved in solvent handling and recovery render this method undesirable when compared with the mechanical method of mixing by means of a rubber mill or "Banbury" mill.

While there have been described various embodiments of the invention, the products described are not intended to be understood as limiting the scope of the invention as it is realized that changes therewithin are possible and it is further intended that each element recited in the following claim is to be understood as referring to all equivalent elements for accomplishing substantially the same results in substantially the same or equivalent manner, it being intended to cover the invention broadly in whatever form its principle may be utilized.

What is claimed is:

An organic, resinous, transparent, flame-resistant, thermoplastic composition consisting essentially of 72 parts of polystyrene, 27 parts of chlorinated paraffin wax containing 64% to 68% of chemically combined chlorine, and one part of glycidyl oleate.

HARRY S. OLSON.
ROBERT C. DANISON.

(References on following page)

REFERENCES CITED

The following references are of record in the file of this patent:

UNITED STATES PATENTS

| Number | Name | Date |
|---|---|---|
| 2,397,093 | Dreyfus et al. | Mar. 26, 1946 |
| 2,421,408 | Brookman et al. | June 3, 1947 |
| 2,469,107 | Dimpfl et al. | May 3, 1949 |

FOREIGN PATENTS

| Number | Country | Date |
|---|---|---|
| 418,230 | Great Britain | Oct. 22, 1934 |

OTHER REFERENCES

Diamond Chlorowax, page 4, Bulletin published 1945 by Diamond Alkali Co.

Diamond Chlorowax, pages 1 and 5, published in 1945 by Diamond Alkali Company.